United States Patent [19]

Brant

[11] Patent Number: 4,872,087

[45] Date of Patent: Oct. 3, 1989

[54] MECHANICAL ASSEMBLY MEANS FOR GRAND FAULT INTERRUPTER RECEPTACLE

[75] Inventor: Edward J. Brant, Mattydale, N.Y.

[73] Assignee: Pass & Seymour, Inc., Syracuse, N.Y.

[21] Appl. No.: 5,085

[22] Filed: Jan. 20, 1987

[51] Int. Cl.[4] .................... H02B 1/08

[52] U.S. Cl. .................... 361/356; 361/394; 361/395; 361/45

[58] Field of Search .................... 335/6, 18, 16, 202, 335/200; 361/42-50, 394, 395, 399, 356; 439/111, 121, 404, 441, 142, 440, 426; 174/52 R, 91, 92; 200/303; 220/4 B

[56] References Cited

U.S. PATENT DOCUMENTS

| | | | |
|---|---|---|---|
| 3,668,476 | 6/1972 | Wrabel et al. | 361/395 X |
| 3,757,031 | 9/1973 | Izraeli | 174/92 X |
| 3,908,154 | 9/1975 | Gryctko | 361/45 |
| 4,001,652 | 1/1977 | Klein et al. | 361/45 X |
| 4,039,902 | 8/1977 | Lacan et al. | 361/394 X |
| 4,081,852 | 3/1978 | Coley et al. | 361/45 |
| 4,209,762 | 6/1980 | Samborski et al. | 361/42 X |
| 4,236,128 | 11/1980 | Cooper et al. | 361/356 X |
| 4,295,180 | 10/1981 | Herron et al. | 361/399 X |
| 4,345,225 | 8/1982 | Lemmer | 335/202 X |
| 4,500,746 | 2/1985 | Meehan | 439/404 X |
| 4,500,943 | 2/1985 | Greene | 361/383 |
| 4,507,709 | 3/1985 | Morris et al. | 361/395 X |
| 4,549,241 | 10/1985 | Morris et al. | 361/394 X |
| 4,627,679 | 12/1986 | Billette de Villemeur et al. | 439/121 X |
| 4,641,216 | 2/1987 | Morris et al. | 361/45 |
| 4,716,493 | 12/1987 | Zelkowitz | 361/383 |

*Primary Examiner*—A. D. Pellinen
*Assistant Examiner*—A. Jonathan Wysocki
*Attorney, Agent, or Firm*—Charles S. McGuire

[57] ABSTRACT

A principal aspect of the disclosure concerns housing means for an electrical receptacle comprising front and rear sections which are retained in assembled relation by snap fit coupling of terminal ends of post members on one section with edges of wall portions on the other section. The housing is disclosed in the context of a receptacle having ground fault circuit interrupting capability. Other disclosed features include snap-fit connection means for other components of a ground fault receptacle, a wiring board having solid state components of a ground fault circuit mounted on one surface and electro-mechanical components on the other, and a ground fault receptacle having both screw-type and push wire terminations. The foregoing features are made possible by a unique design and arrangement of parts which facilitates automated assembly of the entire receptacle.

21 Claims, 4 Drawing Sheets

MECHANICAL ASSEMBLY MEANS FOR GRAND FAULT INTERRUPTER RECEPTACLE

BACKGROUND OF THE INVENTION

The present invention relates to electrical receptacles and, more particularly, to the mechanical assembly of the housing and other receptacle components. Some aspects of the invention are particularly directed to that class of receptacle including ground fault circuit interruption capability.

Electrical receptacles for accepting the prongs of conventional-type plugs to connect a line cord to a source of electrical power are designed for mounting in ordinary household or common trade size junction boxes. The electrical contacts to which the incoming power, neutral and grounding wires are connected, as well as other receptacle components, are normally contained within housing means such as a two-part assembly of front and rear sections to form a protective enclosure for the components. The two sections are normally maintained in assembled relationship by means of screws or other such fasteners, installed as part of the assembly operation. Such screws may be easily removed, of course, permitting disassembly of the receptacle by end users of the receptacles.

Receptacles having ground fault interruption capability incorporate many components, both electrical and mechanical, in addition to those found in ordinary receptacles. For example, all of the GFI circuitry components, as well as fixed and movable relay contacts, and test and reset switches with manually operable buttons accessible on the front of the receptacle, must be accommodated by the receptacle assembly without undue increase in its size. That is, the receptacle should still be sized to fit an ordinary household or trade size junction box. To this end, ground fault receptacles such as those disclosed in U.S. Pat. Nos. 4,001,647, 4,013,929, 4,084,203 and 4,209,762 have been designed to provide more economical use of the space available within the receptacle housing without sacrifice of any operational features.

It is a principal object of the present invention, in one aspect thereof, to provide an electrical receptacle which is constructed to permit assembly in a more rapid and efficient manner than prior art receptacles of similar design.

Another object is to provide a ground fault receptacle having a two-part housing which may be easily placed in assembled relation without the use of ordinary fasteners, but which is difficult to disassemble.

A further object is to provide a ground fault receptacle having a plurality of components which are mutually assembled and retained in a desired relationship by means of snap-fit connections, rather than the more conventional retaining and fastening means.

Still another object is to provide a ground fault receptacle having a cooperative combination of elements configured and arranged to permit better economy of space than in prior art units of the same or larger external dimensions, thereby allowing the use of desirable design features including alternative screw and push wire terminations.

An additional object is to provide a ground fault receptacle having design features which facilitate assembly by automated means, thereby greatly reducing labor costs associated with manufacture of the device.

Yet another object is to provide a ground fault receptacle having components contained in a two-section housing wherein separation of the sections serves automatically to remove electrical power from any load which may be connected to the receptacle.

Other objects will in part by obvious and will in part appear hereinafter.

SUMMARY OF THE INVENTION

In accordance with the foregoing objects, the present invention contemplates an electrical receptacle, particularly a receptacle having ground fault interruption capacity, including two-piece housing means with front and rear body sections provided with unique mutual engagement means for placing and maintaining the sections in assembled relation. Rather than the usual screws, rivets, or other such fasteners, the sections are held together by snap fit of a stepped lip on end portions of flexible posts extending from one of the sections over edges of wall portions on the opposite sections.

In the disclosed embodiment, both the front and rear sections are unitary plastic moldings with posts extending integrally from essentially the four corners of the rear section. The posts have a single terminal edge and taper outwardly therefrom to the stepped lip. The front section includes three-sided channels extending along the four corners for accepting the posts with an opening in the outside wall of each channel forming an edge over which the stepped lip on the end portion of each post is engaged when the two sections are brought fully into engagement to form an enclosure for the internal components of the receptacle. In addition, a wall member behind the opening in the channels inhibits movement of the end portions of the posts to disengage the stepped lips from the edges over which they extend. Thus, once the receptacle is completely assembled by joining the front and rear housing sections by snap fit of the stepped lips on the post ends with the edges of the openings in the channel ends, it is very difficult to separate the sections without permanently damaging the device.

In addition to the front and rear housing sections, a number of other components of the receptacle, including the test and reset buttons, relay coil support, and latch block, are assembled with mating parts by snap fit, thus simplifying assembly and facilitating the use of automated assembly means. All components of the GFI circuitry are surface-mounted on one side of a compact wiring board and the coil and other components of the relay are mounted in a unitary plastic piece attached to the other side. The combination of design features permits the number of human operators traditionally used to perform individual assembly operations to ¼ or 1/5 of the number required in the manufacture of such devices by conventional techniques.

The mounting strap or yoke used in the receptacle is flat with a central cut-out portion through which the operating pins of the test and reset buttons extend. The pin or stem attached to the reset button includes an end portion having a stepped lip engageable with an edge portion of a movable latch member which cooperates with a traveling latch block arranged to engage free terminal ends of a pair of spring arms which are anchored to the support structure and connected into the GFI circuitry at their opposite ends. The movable relay contacts are positioned on the free ends of the spring arms and normally held in closed relation with the stationary contacts by the latch block, which maintains the spring arms in a flexed position and is held in such position by the movable latch member. Upon occurence of a ground fault or grounded neutral condition in the circuit connected to the receptacle, the solenoid is actuated to release the latch member from engagement with the reset button stem, permitting the spring arms carrying the movable relay contacts to move to their unflexed position under the biasing force of the spring material from which they are made, carrying the traveling latch block with them.

The foregoing arrangement makes possible the mounting of the latch block and cooperating reset button stem essentially at the center of the receptacle. Also, with the economies of space and relative arrangement of the components, the externally visible and manually engageable portions of the test and reset buttons may be considerably larger than those on conventional ground fault receptacles. In the disclosed embodiment, for example, the two buttons each extend substantially the entire width of the receptacle housing and are arranged one above the other in virtually the entire distance between the plug openings in the receptacle. This is a very desireable feature since it permits the use of larger and more complete graphics on the buttons, better accessibility and easier operation.

The foregoing and other features of the design and operation of the electrical receptacle of the invention will be more apparent from a consideration of the accompanying drawings and the ensuing detailed description of the preferred embodiment.

DETAILED DESCRIPTION

Figure 1:
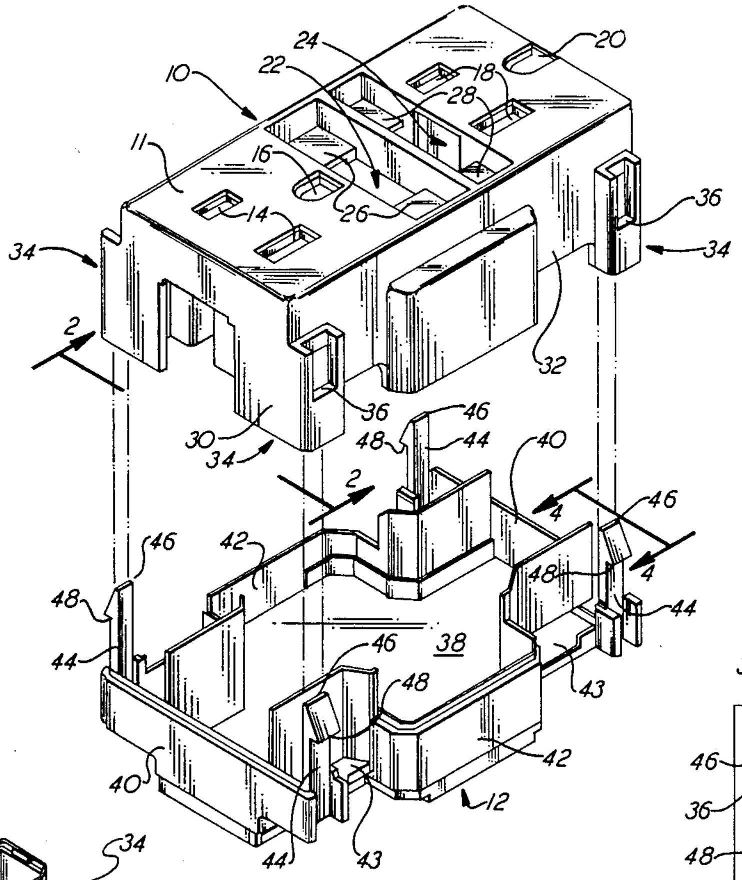
FIG. 1 is a perspective view of front and rear sections of an electrical receptacle housing constructed according to the present invention, shown in separated relation.

Referring now to the drawings, in FIG. 1 is shown an electrical receptacle housing comprising front and rear sections 10 and 12, resepctively, each of which is a single-piece, plastic, molded part. Front wall 11 of section 10 includes through openings 14 for accepting the prongs of a standard plug (not shown) for connecting a line to a source of electrical power in the usual manner, as well as opening 16 for the grounding prong of plugs so equipped. A second set of openings 18 and 20 provide a duplex receptacle for simultaneous or alternate connection oof another plug. Between the two sets of plug connection openings are a pair of openings 22 and 24 in front wall 11 of front section 10. Recessed wall portions 26 and 28 are provided on each side of through openings in openings 22 and 24, respectively. Front section 10 includes end walls 30 and side walls 32, formed integrally with front wall 11. At each of its four corners, extending outwardly from side walls 32, front section 10 includes wall members forming three-sided channels, each denoted generally by reference numeral 34. The central one of the three wall members forming channels 34 terminate short of the upper ends of the two outside wall members, thereby providing an edge portion 36 in each channel.

Rear section 12 includes rear wall 38, with end walls 40 and side walls 42 extending integrally therefrom. Side walls 42 are angled inwardly, being spaced more closely at the ends than in the central part, providing wall portions 43, parallel to rear wall 38, which extend outwardly of the side walls at each corner. Extending upwardly from wall portions 43 adjacent each of the four corners are posts 44, terminating at their upper ends in essentially sharp edges 46. The outside surfaces of posts 44 taper outwardly from edges 46 and then extend inwardly to formed stepped lips 48.

Figure 3:
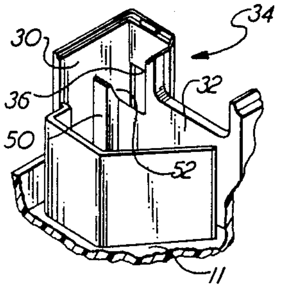
FIG. 3 is a fragmentary, perspective view of a portion of one of the sections of FIG. 1.
Figure 4:
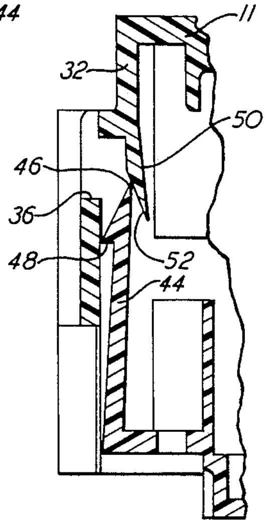
FIG. 4 is a fragmentary, elevational view of a portion of FIG. 1, in section on the line 4—4 thereof, showing the components in an intermediate stage of assembly of the housing sections.
Figure 2:
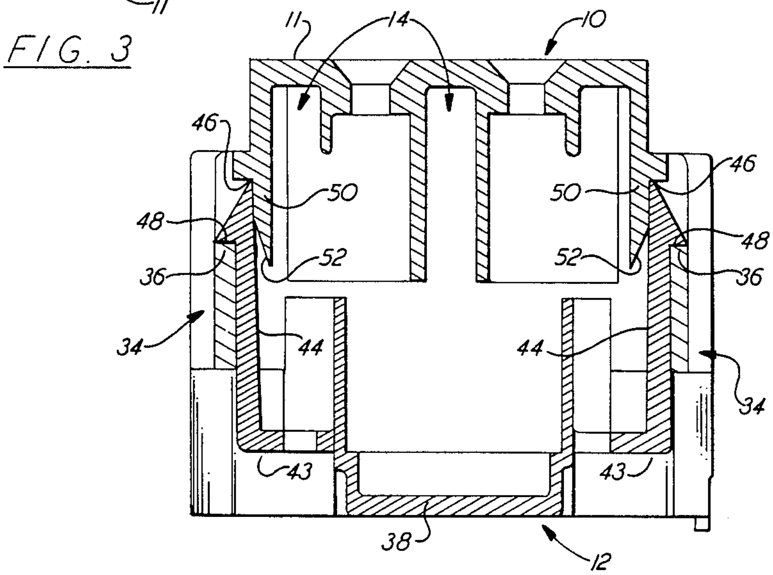
FIG. 2 is an elevational view of the housing sections of FIG. 1 in assembled relation, in full section on the line 2—2 thereof.

Channels 34 on front section 10 are positioned for alignment with posts 44 on rear section 12, as indicated in FIG. 1. As the front and rear sections are moved linearly together, posts 44 slide into channels 34 until stepped lips 48 seat over edges 36, as shown in FIG. 2. An internal view of one of channels 34, with front section 10 inverted from its FIG. 1 position is shown in FIG. 3. Wall portions 50, having tapered surfaces 52, are provided on front section 10 immediately behind each of channels 34. The plastic material from which front and rear housing sections 10 and 12 are formed provides some degree of resilience, allowing limited relative movement of parts when a flexing force is applied thereto, with the parts returning to their original positons when the force is removed. In FIG. 4, one of posts 44 is shown in an intermediate position as the front and rear sections are moved together during the assembly operation. As stepped lip 48 engages the rear surface of the center wall of channel 34, post 44 is flexed inwardly. Wall portion 50 is also flexed inwardly by edge 46 of post 44 as it slides up tapered surface 52. When the sections have been moved together to the extent that stepped lips 48 clears edges 36, posts 44 move back to their normal, unflexed positions.

As seen in FIG. 2, stepped lips 48 on each of posts 44 are engaged over edges 36 of channels 34, thus preventing movement of the front and rear sections back toward the disassembled condition. Furthermore, wall portions 50 move back to their normal position, thereby abutting the upper, rear surfaces of posts 44 to prevent rearward movement of the posts to disengage stepped lips 48 from edges 36. Thus, it may be seen that the configuration and arrangement of parts on the front and rear housing sections permit rapid and easy assembly simply by moving the two sections linearly together, yet prevent disassembly by opposite movement of the same parts due to the locking action of stepped lips 48 on posts 44 and the positioning of wall portions 50.

Figure 5:
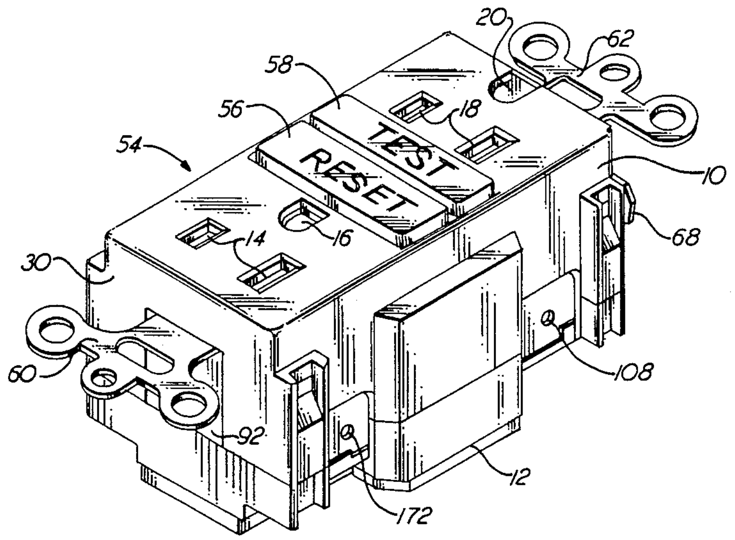
FIG. 5 is a perspective view of an assembled electrical receptacle employing the housing of FIGS. 1-4 and having ground fault circuit interruption capability.
Figure 5A:
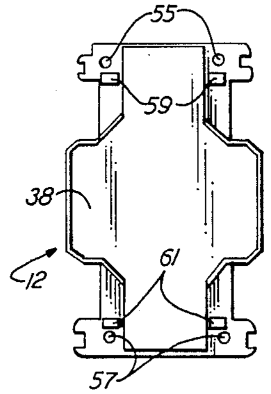
FIG. 5A is an elevational view of the rear wall of the receptacle of FIG. 5.

Turning now to FIG. 5, there is shown a completely assembled duplex receptacle incorporating the housing means of the present invention, and having ground fault circuit interruption capability. The receptacle, indicated generally by reference numeral 54, includes front and rear housing sections 10 and 12, reset and test buttons 56 and 58, respectively, and a grounding strap or yoke having mounting ears 60 and 62 at opposite ends projecting through openings in the housing, as well as parts arranged internally of the housing sections which will be illustrated and explained in connection with subsequent drawing figures. Reset button 56 is mounted within recess 22 of front housing section 10, and test button 58 is similarly mounted within recess 24. It will be noted that buttons 56 and 58 each extend essentially the full width of housing section 10 and are arranged one above the other to extend essentially the full distance between grounding prong hole 16 and plug prong holes 18. Rear wall 38 of rear housing section 12 is shown in FIG. 5A, and includes first and second pairs of openings 55 and 57, respectively, adjacent opposite ends. Additional openings 59 and 61 are positioned adjacent each of openings 55 and 57, respectively, for purposes described later.

Figure 6:
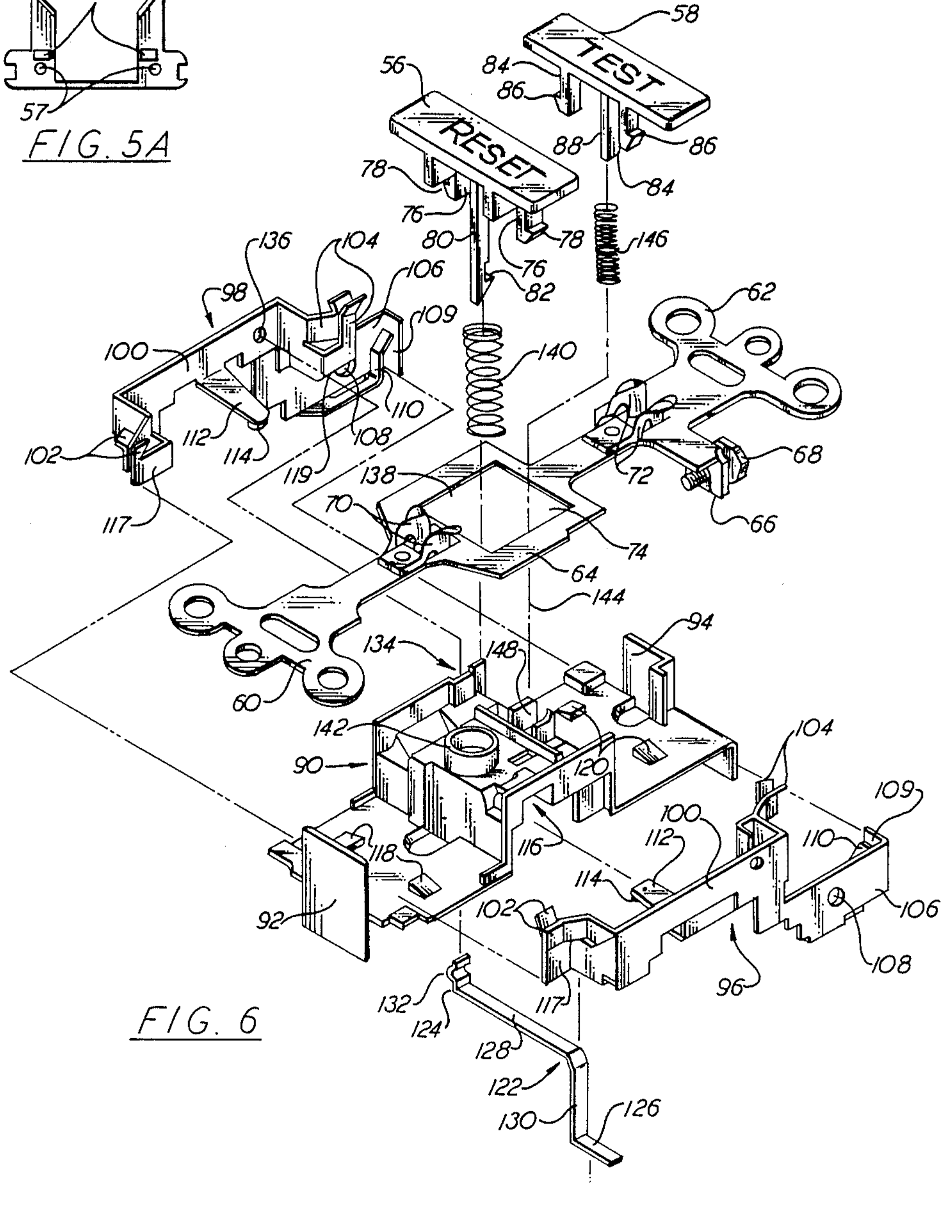
FIG. 6 is an exploded, perspective view of certain components of the ground fault receptacle of FIG. 5, shown without the housing means.

In FIG. 6, reset and test buttons 56 and 58, together with certain internal elements of receptacle 54, are shown in exploded perspective view. Grounding strap 64 is shown in its entirety, with mounting ears 60 and 62 at opposite ends thereof. Strap 64 is formed from a unitary sheet of metal and is flat, except for depending tab 66, having a threaded opening therein to receive screw 68 by means of which a separate ground wire (not shown) may be securely fastened to strap 64. Screw 68 is accessible on the exterior of the fully assembled receptacle 54, as seen in FIG. 5, for the attachment of a ground wire. Contacts 70 and 72 for receiving the grounding prongs of plugs inserted into receptacle 54 in conventional fashion are riveted to strap 64, the central portion of which is open to provide aperture 74.

Extending downwardly from the lower side of reset button 56 are posts 76, each tapering outwardly from a terminal edge portion and then passing inwardly to form stepped lips 78 on each of posts 76. Pin 80, having notch 82 therein, extends downwardly from the lower surface of reset button 56 and is formed integrally therewith, as are posts 76, as a unitary, molded plastic part. Similarly, posts 84, having stepped lips 86, and pin 88 extend integrally downwardly from the lower surface of test button 58. The test and reset buttons are assembled with front housing section 10 by inserting posts 76 and 84 into openings 22 and 24, respectively. Posts 76 and 84 are so spaced that the tapered surfaces engage the inner edges of recessed wall portions 26 and 28, respectively, flexing posts 76 and 84 inwardly as the buttons are moved downwardly until stepped lips 78 and 86 pass and are engaged over the inner edges of the recessed wall portions as posts 76 and 84 return to their unflexed position. Reset and test buttons 56 and 58 may then be moved inwardly until the lower surfaces thereof contact wall portions 26 and 28, and outwardly until stepped lips 78 and 86 contact the wall portions adjacent the inner edges thereof. Travel of the reset and test buttons between their inner and outer positions is sufficient to perform the functions of the respective buttons, as hereinafter described.

A unitary, molded plastic element with compound surfaces, termed a separator and denoted by reference numeral 90 is also shown in FIG. 6. Separator 90 includes end wall portions 92 and 94 which mate with portions of end walls 30 of housing section 10 to form exterior portions of the housing of receptacle 54, part of end wall portion 92 being seen in FIG. 5. Separator 90 extends across the interior of receptacle 54 essentially from side to side and end to end, separating the grounding strap and plug prong receiving contacts on the load terminals on one side from the ground fault circuitry, solenoid, fixed and movable contacts and wire termination connections on the other side.

Separator 90 further serves as a support for load terminals 96 and 98, which are mounted upon the separator to provide a sub-assembly of the receptacle. Load terminals 96 and 98 are formed from single sheets of high conductive metal such as brass or copper, bent to the desired configuration. Each of load terminals 96 and 98 includes side portion 100, having angularly extending portions 102 and 104 at opposite ends which form resilient contacts for receiving the prongs of plugs inserted in receptacle 54. Extending downwardly and outwardly from one of the ends of side portions 100 are wire termination arms 106, each having a threaded opening 108, the opening in the termination arm of terminal 96 also being shown in FIG. 5, where it is seen to be accessible from the exterior of receptacle 54. Thus, the load wires of the electrical circuit which includes receptacle 54 may be connected to load terminals 96 and 98 by screws inserted in openings 108.

In addition to the usual screw-type connections for the load wires, terminals 96 and 98 are provided with push wire terminations. This feature is made possible by the space economies acheived by the configuration and arrangement of components in the ground fault receptacle of the invention. Extending inwardly from and formed integrally with arms 106 are end tabs 109 and resilient arms 110, the latter having free terminal ends which are biased toward engagement with tabs 109. Thus, the terminal ends of the load wires of the electrical circuit in which receptacle 54 is connected may be pushed upwardly (as viewed in FIG. 6) between end tabs 109 and the terminal ends of resilient portions 110. Tight contact between the wires and load terminals will be maintained by resilient portions 110 which are flexed away from their normal position by the wire ends. Openings 55 in rear housing section 12 are sized and positioned so that entry of the ends of the load wires causes engagement thereof between end tabs 109 and resilient portions 110. Likewise, the ends of the line wires may be pushed into openings 57 for engagement with the line terminals, described later, in the same fashion. Openings 59 are provided for insertion of a small tool to push resilient portions 110 to a further flexed position to permit withdrawal of the wire ends, when desired.

Contact arms 112 also extend inwardly from side portions 100 of load terminals 96 and 98. Rounded electrical contacts 114 are affixed to the lower (as viewed in FIG. 6) surfaces of arms 112 near the terminal ends thereof. As explained later, contacts 114 provide the fixed set of contacts through which the circuit is interrupted upon the occurrence of a ground fault or similar circuit malfunction. Load terminals 96 and 98 are assembled with separator 90 by sliding contact arms 112 into slots, one of which is shown at 116, on opposite sides of the lower surface of the separator as lower edges 117 and 119 of angularly extending portions 102 and 104 slide over the upper surface until they engage over ramped portions 118 and 120, respectively, on the upper surface of separator 90. The configuration and material of load terminals 96 and 98, relative to separator 90 is such that the parts are maintained in mutually engaged relationship by a snap fit of edges 117 and 119 of load terminal portions 102 and 104 over ramped portions 118 and 120, and the frictional engagement of contact arms 112 with the lower surface of separator 90.

A further element shown in FIG. 6 is flexible blade 122, comprising upper and lower end portions 124 and 126, respectively, and intermediate portions 128 and 130, each portion being bent at substantially 90° with respect to the adjacent portion(s). Contact 132 is affixed to or formed integrally upper end portion 124. When assembled, intermediate portion 128 lies across the lower surface of separator 90, in a transversely extending channel, with upper end 124 extending into recess 134 in a side wall portion of separator 90. Upper end 124 is captured between the wall portion of separator 90 and side portion 100 of load terminal 98, with contact 132 extending into opening 136 in the load terminal.

Stem 80 of reset button 56 extends through an opening in separator 90, as indicated by dot-dash line 138, with coil spring 140 encircling the stem between the lower surface of the reset button and separator 90, the lower end of the spring fitting within circular portion 142 of the separator. Similarly, pin 88 on test button 58 extends through an opening in separator 90, as indicated by dot-dash line 144, with coil spring 146 encircling the pin and fitting within portion 148 of separator 90. Further details of operation of the test and reset buttons, and related mechanical and electrical portions of the receptacle may be found in U.S. Pat. application Ser. Nos. 5,086 and 5,100, filed of even date herewith and assigned to applicant's assignee.

Figure 7:
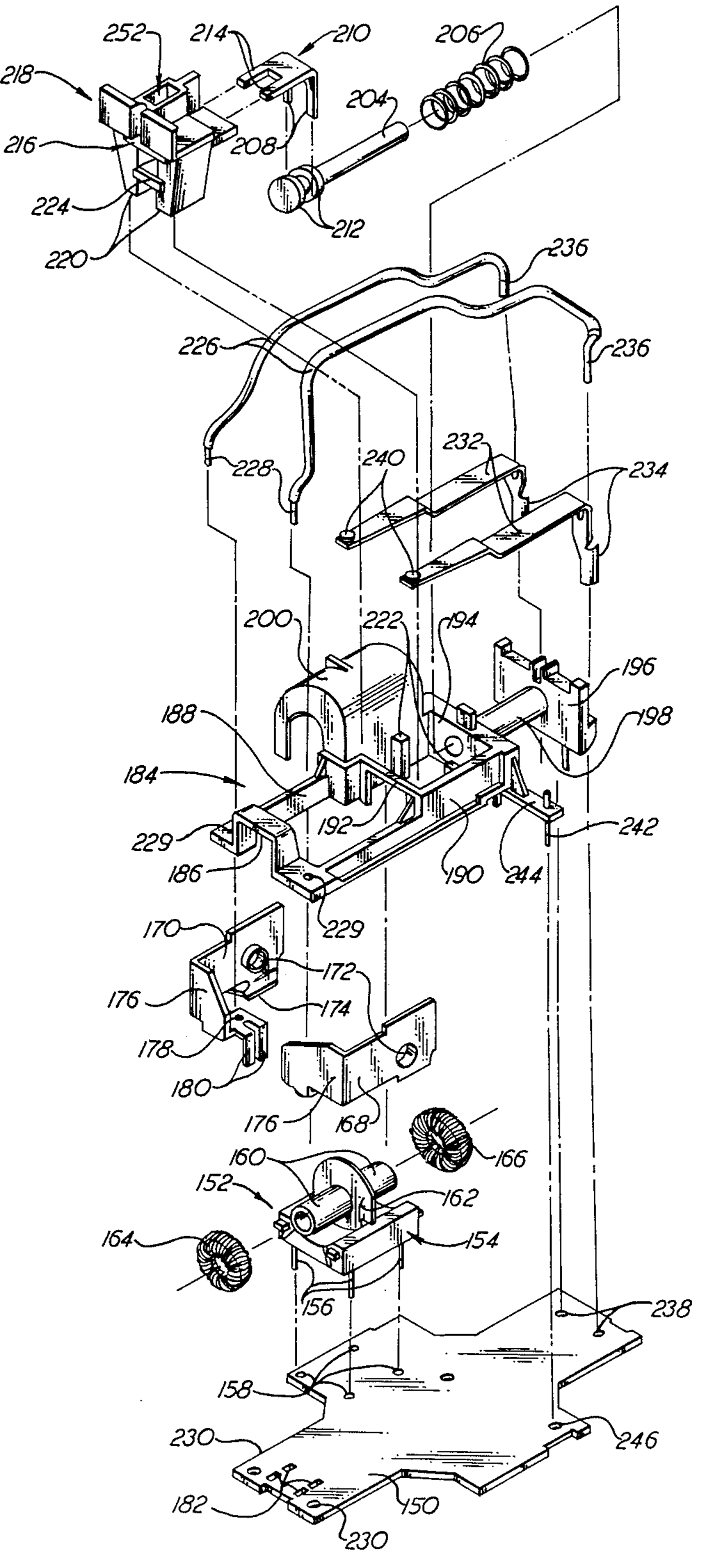
FIG. 7 is an exploded, perspective view of further components of the receptacle of FIG. 5.
Figure 8:
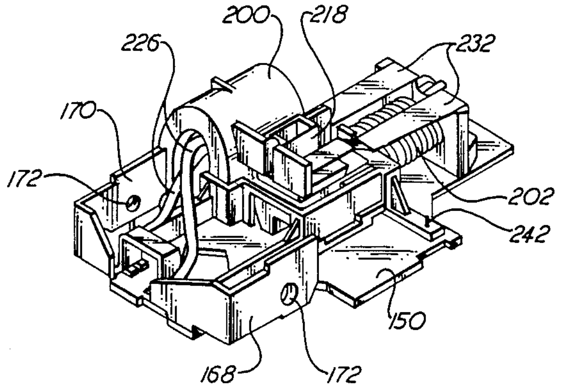
FIG. 8 is a perspective view of the components of FIG. 7, shown in assembled relation to form a complete sub-assembly of the receptacle.
Figure 10:
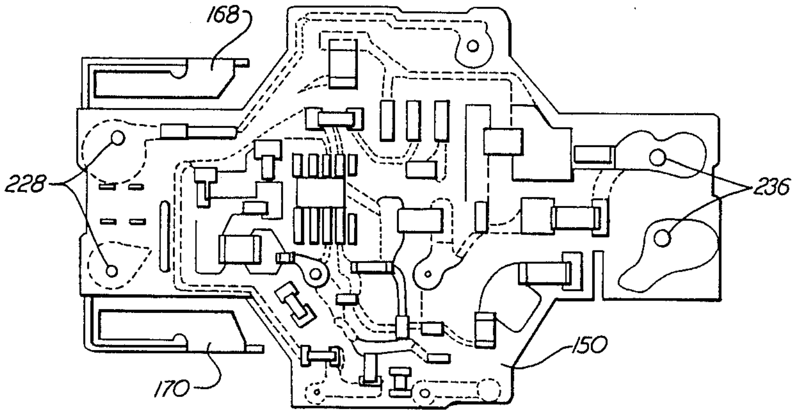
FIG. 10 is a bottom plan view of the sub-assembly of FIG. 9.

Elements of a further subassembly of receptacle 54 are shown in exploded perspective in FIG. 7, and in assembled perspective in FIG. 8. The individual components of the ground fault electronic circuitry are all surface-mounted on circuit board 150, the back surface of which is seen in FIGS. 7 and 8, and the front surface in FIG. 10. In accordance with the usual practise, all circuitry components are mounted on the front surface of circuit board 150. In distinction from prior ground fault receptacles of this type, however, the sensing and grounded neutral detection coils, relay, movable contacts, and other elements of the ground fault system are mounted on the rear surface of the board.

Unitary, molded plastic part 152 includes base portion 154 with four pins 156 extending downwardly therefrom for insertion through openings 158 in board 150. Hollow cylindrical portion 160 extends through wall member 162, all being integral portions of plastic part 152. Coils 164 and 166 are mounted upon cylindrical portion 160, on opposite sides of wall member 162, and comprise toroidal cores wrapped with multiple turns of copper wire in the usual fashion. It is preferred that the cores of coils 164 and 166 be of the ferrite type.

Terminals 168 and 170 for the line wires of the circuit in which receptacle 54 is connected each include a threaded opening 172 for receiving a screw to effect connection of the line wires to the terminals, the opening 172 of one of the terminals being seen in FIG. 5. Terminals 168 and 170 also include means for effecting push wire terminations, alternatively to the screw connections, resilient arms 174 having a terminal end biased into engagement with end tabs 176 for receiving therebetween the ends of line wires pushed through openings 57 in rear housing section 12. Each of terminals 168 and 170 includes portions extending inwardly from end tabs 176 and having an opening 178 and a pair of downwardly extending legs 180, those of terminal 170 only being seen in FIG. 7. Terminals 168 and 170 are mounted on board 150 by insertion of legs 180 through holes 182 in the board.

A second, unitary, molded plastic part 184 includes forward frame portion 186, side frame portions 188 and 190, intermediate frame portion 192, and two rear frame portions 194 and 196, held in spaced relation by hollow, cylindrical member 198. Curved housing portion 200 extends from side frame portion 188, and is arranged in covering relation to coils 164 and 166 in the fully assembled condition of the subasembly, as shown in FIG. 8. Solenoid coil 202 (FIGS. 8 and 9) encircles cylindrical member 198, and armature 204, biased to an outer position by spring 206, travels within hollow member 198 to an inner position when coil 202 is energized. Lower legs 208 of L-shaped latch member 210 straddle armature 204 between spaced collars 212. Thus, as armature 204 travels between its outer and inner positions, latch member 210 is moved therewith to effect opening of the circuit contacts in a manner explained later.

Upper legs 214 of latch member 210 are inserted into through slot 216 of molded plastic latch block 218. Lower portion 220 of the latch block is slidingly received in a recess in plastic part 184 between intermediate wall portion 192 and posts 222 for reciprocating, up and down movement. When the parts are assembled, lip 224 on latch block 218 snaps under intermediate wall portion 192 to prevent the latch block from moving upwardly, out of the recess, beyond the point where lip 224 contacts the lower edge of wall portion 192. Legs 208 and 214 are long enough, relative to the travel of armature 204 and latch block 218, that neither is withdrawn from engagement over armature 204 and within slot 216 by movement of the parts during operation of the ground fault interrupting elements.

Figure 9:
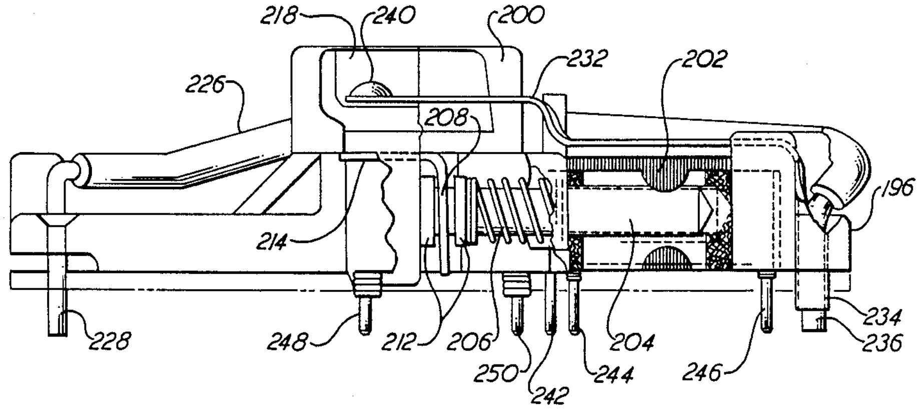
FIG. 9 is an enlarged, side elevational view of the sub-assembly of FIG. 8 with portions broken away.

Wires 226 pass through hollow portion 160 of part 152, and thus through coils 164 and 166. Ends 228 of wires 226 pass through openings 229 in forward frame portion 186 of part 184, and openings 178 in terminals 168 and 170, being electrically connected to the terminals, and through openings 230 in circuit board 150. A pair of spring arms 232 have end portions 234 which are anchored in openings end wall portion 196. Ends 236 of wires 226 pass through and are electrically connected, e.g., by soldering, to end portions 234, and further pass through the openings in end wall portion 196 and openings 238 in circuit board 150, as seen in FIG. 9. Rounded contacts 240 are carried on the free ends of spring arms 232. Metal pin 242 passes through leg 244 of plastic part 184 and through opening 246 in circuit board 150.

The electrical connections of components mounted on the rear side of circuit board 150 with the circuitry on the front surface are illustrated in FIG. 9. Ends 228 and 236 of one of wires 226 are seen extending through board 150 adjacent opposite ends thereof. Ends 244 and 246 of solenoid coil 202 extend through the board at intermediate positions thereon, as do ends 248 and 250 of sensing coils 164 and 166, as well as previously mentioned pin 242. The wire and pin ends are trimmed as necessary and incorporated in the circuitry on the front side of board 150 by solder connections in an automated operation which includes surface-mounting of the other circuit components.

The present invention is not concerned with details of circuit design, many examples of ground fault interruption circuits suitable for employment within the parameters of the present invention being available, such as, for example, those shown in U.S. Pat. No. 4,574,324 and copending application Ser. No. 5,100. In such circuits, an imbalance in current flow in two conductors (in the present disclosure, wires 226) such as would be caused by a ground fault, is sensed by the coil 164, through which the conductors pass. The resulting signal is employed to energize a solenoid coil (202), moving the relay armature (204) to cause disengaging movement of a pair of moveable contacts (240) with respect to fixed contacts (114), thereby interrupting electrical connection between the source and the load. Also, a grounded neutral line causes coil 166 to generate a signal with the same result. In the structure of receptacle 54, contacts 240 are held in a flexed position, in engagement with contacts 114, by latch block 218, which is held in position by engagement of notch 82 of reset button stem 80 with latch 210, the stem extending into through opening 252 of the latch block and between legs 214 of latch 210. Movement of armature 204 to the right, as viewed in FIG. 9, disengages latch 210 from engagement with notch 82, permitting the biasing force of spring arms 232 to move the latch block and return the arms to their unflexed position, thereby separating contacts 240 from contacts 214. The elements may be returned to their original positions by manually depressing reset button 56, causing notch 82 to engage latch 210, the biasing force of coil spring 140 serving to move the reset button, latch block 218 and spring arms 232 back to the "set" position.

The foregoing brief description of the operation of the receptacle elements in response to a ground fault, or similar unsafe condition, is expanded upon in aforementioned copending application Ser. No. 5,086. Similarly, application Ser. No. 5,100 contains a full description of the operation of the elements associated with testing the receptacle for proper ground fault operation. Briefly, test button 58 is manually depressed, against the force of spring 146, moving pin 88 through its opening in separator 90 to engage intermediate portion 128 of blade 122 and move lower portion 126 of the blade into contact with pin 242. This establishes electrical contact between load terminal 98, through contact 132, blade 122 and pin 242, and the circuitry on the front surface of circuit board 150 to which pin 242 is connected, thereby simulating a ground fault condition and causing the solenoid and other elements to operate as previously described to open the circuit.

From the foregoing, it may be seen that the various elements of receptacle 54 are so designed that automated assembly operations are facilitated, and the number of persons required to effect complete assembly is minimized. In addition to the snap-fit assembly of the front and rear housing sections, other elements which are assembled in snap-fit relation are both reset and test buttons 56 and 58 on front housing section 10, load terminals 96 and 98 on separator 90, latch block 218 in the recess in part 184, and cover 200 of plastic part 184 with coil support 152. The snap fit assembly of the front and rear housing sections not only facilitates joining the two parts together, but the elements are so configured and relatively arranged that once assembly is complete, disassembly is very difficult without causing permanent damage to the parts. Thus, the risk of injury due to unintended tampering with internal parts is substantially reduced.

The mounting of the sensing and grounded neutral coils, solenoid, movable contacts, etc. directly upon the circuit board provides a compact subassembly which is simply placed in the cavity provided therefor in rear housing section 12. A further desirable feature is the snap fit connection within this subassembly of plastic parts 152 and 184. For this purpose, openings such as that denoted in FIG. 7 by reference numeral 201 are provided at appropriately placed locations in housing portion 200 of part 184 for engagement by projections 153 on part 152. Grounding strap 64 is likewise placed in a mating cavity in front housing section 10, and reset and test buttons 56 and 58 are snap fitted in their respective cavities. Separator 90, carrying load terminals 96 and 98, and blade 122, is placed between the two, with springs 140 and 146 properly positioned, and assembly is completed by snap fit connection of the two housing sections. The compact nature of the device permits such desireable features as both screw-type and push wire terminations, and the use of relatively large test and reset buttons.

What is claimed is:

1. In an electrical plug-receiving duplex receptacle having a housing enclosure, means for mounting metal load terminals on a plastic support member without the use of mechanical fasteners, said means comprising:

(a) a pair of metal load terminals each including a side portion, first and second end portions extending integrally from opposite ends of said side portion, and a contact arm extending integrally from said side portion at a position between said end portions;

(b) each of said end portions including opposed contact portions for receiving therebetween the blades of an electrical plug inserted in said receptacle, and lower, linear edge portions;

(c) a unitary, plastic, support member having upper and lower surfaces and means for engagement with said housing enclosure to effect predetermined positioning of said support member within said enclosure;

(d) first and second pairs of ramped portions tapering upwardly from said upper surface and terminating in stepped edges;

(e) said load terminals and support member being so configured and arranged that said load terminals may be moved toward said support member from opposite sides thereof with said contact arms extending below and contacting said lower surface and said side portions extending above and contacting said upper surface, each of said side portions of each of said load terminals having edge portions resiliently engaged over respective ones of said stepped edges of said ramped portions to define the fully engaged position of said load terminals on said support member, whereby said load terminals are engaged with said support member by a snap fit.

2. The invention according to claim 1 wherein each of said contact arms includes a stationary electrical contact adjacent the terminal end thereof remote from said side portion for cooperative engagement by a movable electrical contact.

3. The invention according to claim 2 wherein said receptacle comprises a ground fault interrupter receptacle further including test and reset buttons mounted upon said housing enclosure by snap fit assembly of lip portions on terminal ends of a pair of arms formed integrally with each of said buttons with edge portions of said housing enclosure.

4. The invention according to claim 3 wherein said ground fault interrupter receptacle further includes a pair of movable electrical contacts, a movable latch block for cooperative movement with said movable contacts, a plastic part upon which said latch block is movably mounted, and means for mounting said latch block upon said plastic part by snap fit assembly.

5. An electrical receptacle having ground fault circuit interrupting capability and adapted for automated assembly, said receptacle comprising, in combination:

(a) front and rear body sections having respective mutual engagement portions for retaining said sections in assembled relation by first snap-fit means upon movement thereof from spaced to assembled relation wherein said sections provide an enclosed housing;

(b) a first subassembly positioned within said housing and including an essentially planar wiring board carrying on a first surface thereof all solid state components of the ground fault interrupter circuitry and printed wiring connections thereof, and on a second surface electromechanical components of the GFI circuitry, including the solenoid, a pair of toroidal coils, movable circuit-breaking contacts and a first set of line terminals;

(c) a second subassembly positioned within said housing and including a plastic support member and a second set of load terminals carrying fixed circuit-breaking contacts mounted upon said support member by second snap-fit means;

(d) a grounding strap extending through said enclosure and having mounting ears extending outwardly on opposite sides thereof; and (e) test and reset buttons, each having first portions for assembly of said buttons with said front housing section by third snap-fit means, and second portions extending interiorly of said enclosure for cooperative engagement with means for testing and resetting said ground fault interrupter circuitry.

6. The invention according to claim 5 wherein said first subassembly includes a second plastic support member upon which said coils are mounted, and means for fixedly mounting said second support member on said wiring board.

7. The invention according to claim 6 wherein said first subassembly further includes a third plastic support member upon which said solenoid is mounted, and means for fixedly mounting said third support member on said wiring board.

8. The invention according to claim 7 and further including a pair of electrically conducting spring arms each having a free terminal end carrying one of said movable circuit-breaking contacts and an anchored terminal end passing through openings in said third support member and said wiring board and electrically connected to said ground fault interrupter circuitry on said first surface of said wiring board.

9. An electrical receptacle having ground fault circuit interrupting capability and means for connecting load and line wires alternatively by either screw or push-wire terminations, said receptacle comprising:

(a) front and rear housing sections in assembled relation forming a protective enclosure;

(b) a first subassembly positioned within said enclosure and including an essentially planar wiring board having printed circuitry connecting solid state and electromechanical components and a pair of line terminals mounted upon said board;

(c) a second subassembly positioned within said enclosure and including a plastic support member and a pair of load terminals mounted thereon;

(d) said first and second subassemblies being so positioned within said enclosure that said pairs of line and load terminals are positioned adjacent opposite ends thereof, and the terminals of each of said pairs are positioned on opposite sides of said enclosure;

(e) each of said line and load terminals having a threaded opening therein for receiving a screw to attach an electrical wire end to the respective terminal, and an integral spring arm and wall portion, said spring arm having a terminal end biased into engagement with said wall portion to receive therebetween an electrical wire end;

(f) first aperture means in said enclosure adjacent said threaded opening in each of said terminals, thereby permitting insertion of a screw and attachment of a wire end to each of said terminals from the exterior of said enclosure; and (g) second aperture means in said enclosure adjacent said spring arm and wall portion of each of said terminals, whereby insertion of a wire end through said second aperture means attaches said wire end to said terminal by engagement of said wire end between said spring arm terminal end and wall portion.

10. The invention according to claim 9 wherein said second aperture means comprise four openings, one adjacent each of said spring arm terminal ends, in said rear housing section.

11. The invention according to claim 10 and further including third aperture means for insertion of a tool to release said wire ends from engagement between said spring arm terminal ends and wall portions.

12. The invention according to claim 11 wherein said third aperture means comprise four openings in said rear housing sections, one adjacent each of said openings of said second aperture means.

13. An electrical receptacle for connection to hot and neutral conductors and having ground fault circuit interrupting capability comprising:

(a) a protective housing having a front wall with openings for receiving an electrical plug;

(b) a circuit board mounted within said housing and having printed wiring for a ground fault interrupter circuit on one surface of said board;

(c) a pair of fixed electrical contacts;

(d) a pair of movable electrical contacts carried on electrically conducting arms mounted for movement into and out of engagement with said fixed contacts;

(e) a solenoid including a coil and an armature movable to effect movement of said movable contacts;

(f) at least one toroidal-wound coil adapted to generate an electrical signal in response to an imbalance of current flowing through said hot and neutral conductors;

(g) means for mounting said arms, said solenoid coil and armature, and said toroidal-wound coil on the surface of said board opposite said one surface with portions of said arms, said solenoid coil and said toroidal-wound coil extending through said board and electrically connected on said one surface to said ground fault interrupter circuit; and (h) a plurality of solid state components forming a part of said ground fault interrupter circuit, all of said components being surface-mounted upon and electrically connected to said printed wiring of said one surface of said circuit board.

14. The invention according to claim 13 wherein said mounting means comprises a first plastic part carrying said solenoid coil and a second plastic part carrying said toroidal-wound coil.

15. The invention according to claim 14 and further including means for snap-fit connection of said first and second plastic parts to one another.

16. Two-part housing means for an electrical wiring device having cooperative engagement means permitting easy mutual assembly and thereafter essentially preventing non-destructuve disassembly of the two parts of said housing means, comprising:

(a) a first body section having a first, substantially planar wall and a pair of opposite side walls extending substantially perpendicularly from said first wall;

(b) a second body section having a second, substantially planar wall and placeable in fully assembled relation with said first body section to form an enclosed housing with said first and second walls in spaced, parallel relation; and (c) means for placing and maintaining said first and second body sections in said fully assembled relation and including:

(i) at least one rigid, immovable, first section of each of said side walls having a stepped edge extending parallel to and facing said first wall and an inwardly facing, planar surface extending from said stepped edge away from said first wall;

(ii) at least one second section of each of said side walls extending from said first wall toward said first section to a terminal edge and having an outwardly facing, planar surface in a plane parallel to and spaced a predetermined distance inwardly from the plane of said inwardly facing surface;

(iii) at least one post member extending perpendicularly from each side of said second wall toward said first wall, from an anchored end to a free end, one of said post members being provided for each of said first and second side wall sections, said post members extending generally along parallel axes;

(iv) each of said post members having forward and rear surfaces extending from said anchored end and spaced by said predetermined distance, a stepped lip extending outwardly from said forward surface and a tapered surface extending from said lip to meet said rear surface at said free end;

(v) the material and configuration of said post members providing limited flexibility about said anchored ends in forward and rear directions between flexed and unflexed positions; and (vi) said first and second side wall sections and said post members being so constructed and arranged that movement of said body sections toward one another in a direction along said post member axes causes contact of said lip of each of said post members with the corresponding one of said inwardly facing surfaces and movement of said post members to said flexed positions thereof as said body sections are moved toward one another, said post members returning to said unflexed position when said body sections are in said fully assembled relation with said lips engaged over the corresponding one of said stepped edges, preventing reverse relative movement of said body sections away from said fully assembled relation, portions of said forward and rear surfaces of said post members respectively contacting said inwardly and outwardly facing surfaces of said first and second sections of said side walls, respectively, essentially preventing disengagement of said lips from said stepped edges.

17. The invention according to claim 16 wherein said first and second walls each have four corners, said first and second sidewall sections and said post members being positioned adjacent said corners of said first and second body sections, respectively.

18. The invention according to claim 17 wherein each of said first sections of said side walls forms one side of a three-sided channel into which said free ends of said post members are inserted as said first and second body sections are moved toward said fully assembled relation.

19. The invention according to claim 16 wherein said wiring device comprises a wall receptacle and said first body section includes at least one set of openings in said first wall for receiving the prongs of an electrical plug.

20. The invention according to claim 19 wherein said receptacle includes ground fault interrupter means.

21. The invention according to claim 16 wherein said second side wall sections include a surface contiguous with, angularly disposed with respect to and sloping away from said outwardly facing, planar surface for contact with said free ends of said post members as said first and second body sections are moved toward said fully assembled relation.

* * * * *

UNITED STATES PATENT AND TRADEMARK OFFICE

CERTIFICATE OF CORRECTION

PATENT NO. : 4,872,087

DATED : October 3, 1989

INVENTOR(S) : Edward J. Brant

It is certified that error appears in the above-indentified patent and that said Letters Patent is hereby corrected as shown below:

On the Title page, item [54] and col. 1, lines 1-2:

The title should read -- MECHANICAL ASSEMBLY MEANS FOR GROUND FAULT INTERRUPTER RECEPTACLE --.

Signed and Sealed this

Fifteenth Day of April, 1997

Attest:

BRUCE LEHMAN

*Attesting Officer*

*Commissioner of Patents and Trademarks*